United States Patent [19]
Choi

[11] Patent Number: 5,305,100
[45] Date of Patent: Apr. 19, 1994

[54] BIDIRECTIONAL COMMUNICATION SYSTEM FOR CCTV

[75] Inventor: Hyeon J. Choi, Kyungsangbook, Rep. of Korea

[73] Assignee: Goldstar Co., Ltd., Rep. of Korea

[21] Appl. No.: 997,242

[22] Filed: Dec. 28, 1992

[30] Foreign Application Priority Data

Dec. 27, 1991 [KR] Rep. of Korea ............... 24556/1991

[51] Int. Cl.$^5$ ............................................. H04N 7/10
[52] U.S. Cl. .................... 348/159; 359/146; 348/211
[58] Field of Search .................. 358/108, 210, 85, 86; 379/53; 359/146; H04N 7/10

[56] References Cited

U.S. PATENT DOCUMENTS

| | | | |
|---|---|---|---|
| 4,882,747 | 11/1989 | Williams | 379/53 |
| 4,965,819 | 10/1990 | Kannes | 379/53 |
| 4,989,085 | 1/1991 | Elberbaum | 358/210 |
| 4,995,071 | 2/1991 | Weber | 379/53 |
| 5,079,634 | 1/1992 | Hosono | 358/210 |

Primary Examiner—Howard W. Britton
Attorney, Agent, or Firm—Ostrolenk, Faber, Gerb & Soffen

[57] ABSTRACT

A bidirectional communication system for a CCTV in a monitoring system having a plurality of monitoring cameras, comprising a plurality of rotators, each for rotating a corresponding one of the plurality of cameras in vertical and horizontal directions in response to upward, downward, left and right rotation control signals, a plurality of voice transmission and reception adapters, each mounted to a corresponding one of the plurality of cameras, for transmitting and receiving a voice signal, a plurality of remote controllers, each having a transmitter and a receiver for transmitting and receiving the voice signal remotely through a corresponding one of the plurality of voice transmission and reception adapters, a video selector for selecting a desired one of video signals from the plurality of cameras, a channel selector for selecting a desired channel for voice communication and camera rotation control, a voice processing circuit for performing transmission and reception of the voice signal through the plurality of voice transmission and reception adapters, and a rotator control circuit for generating the upward, downward, left and right rotation control signals for controlling actuation of the plurality of rotators, thereby to control projection angles of the plurality of cameras.

6 Claims, 8 Drawing Sheets

BIDIRECTIONAL COMMUNICATION SYSTEM FOR CCTV

BACKGROUND OF THE INVENTION

1. Field of the Invention

The present invention relates in general to a closed circuit television (CCTV) monitoring system, and more particularly to a bidirectional communication system for a CCTV which is useful to bidirectional communication in a CCTV monitoring system.

2. Description of the Prior Art

Referring to FIG. 1A, there is shown a block diagram of a conventional CCTV monitoring system. As shown in this drawing, the conventional CCTV monitoring system comprises a plurality of cameras CAM1–CAM4 installed in places to be monitored, a video selector 1 for selecting desired one of video signals from the plurality of cameras CAM1–CAM4, and a monitor 2 for displaying the video signal selected by the video selector 1.

The operation of the conventional CCTV monitoring system will hereinafter be described.

The plurality of cameras CAM1–CAM4 installed in the places to be monitored shoot objects in the monitored places and output the resultant video signals. A desired one of the video signals outputted from the plurality of cameras CAM1–CAM4 is manually or automatically selected by the video selector 1. The video signal selected by the video selector 1 is displayed through the monitor 2.

Therefore, an observer can monitor the plurality of places shot by the plurality of cameras CAM1–CAM4 through the single monitor 2.

Referring to FIG. 1B, there is shown a block diagram of a voice output system which is applied to the conventional CCTV monitoring system. The voice output system in FIG. 1B is provided in the conventional CCTV monitoring system such that the observer issues an order or sends a message while watching a video picture shot by the camera. The voice output system comprises a microphone MIC for converting a voice from the observer into an electrical voice signal, a voice output circuit 3 for amplifying the voice signal through the microphone MIC by a predetermined level and outputting the amplified voice signal, and a plurality of speakers SP1–SPn for converting the electrical voice signal outputted from the voice output circuit 3 into the original voice.

The observer while watching the monitor 2 outputs the voice signal through the microphone MIC to the places being shot by the cameras CAM1–CAM4. The voice signal through the microphone MIC is amplified by the predetermined level and then fed to the speakers SP1–SPn by the voice output circuit 3. As a result, the observer can send a message to the places being shot by the cameras.

However, the conventional CCTV monitoring system has a disadvantage, in that the voice output system is further provided to send the voice message from the observer to the places being monitored, resulting in an increase in the cost. Also, the observer confirms the video picture of the place being monitored with the eye through the monitor and sends the voice message to an object in the place utilizing the voice output system and the voice from the observer is sent through the plurality of speakers. As a result, there may be wanting in an accuracy of the communication. Furthermore, a smooth monitoring network cannot be built up since the object in the place being monitored has no means for communication with the observer.

SUMMARY OF THE INVENTION

Therefore, the present invention has been made in view of the above problems, and it is an object of the present invention to provide a bidirectional communication system for a CCTV which is capable of building up an smooth and accurate bidirectional communication network between an observer and an object to be monitored.

In accordance with the present invention, the above and other objects can be accomplished by a provision of a bidirectional communication system for a CCTV in a monitoring system having a plurality of monitoring cameras, comprising: a plurality of rotators, each for rotating a corresponding one of said plurality of cameras in vertical and horizontal directions in response to upward, downward, left and right rotation control signals; a plurality of voice transmission and reception means, each mounted to a corresponding one of said plurality of cameras, for transmitting and receiving a voice signal; a plurality of remote control means, each having a transmitter and a receiver for transmitting and receiving the voice signal remotely through a corresponding one of said plurality of voice transmission and reception means; video selecting means for selecting a desired one of video signals from said plurality of cameras; channel selecting means for selecting a desired channel for voice communication and camera rotation control; voice processing means for performing transmission and reception of the voice signal through said plurality of voice transmission and reception means; and rotator control means for generating the upward, downward, left and right rotation control signals for controlling actuation of said plurality of rotators, thereby to control projection angles of said plurality of cameras.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
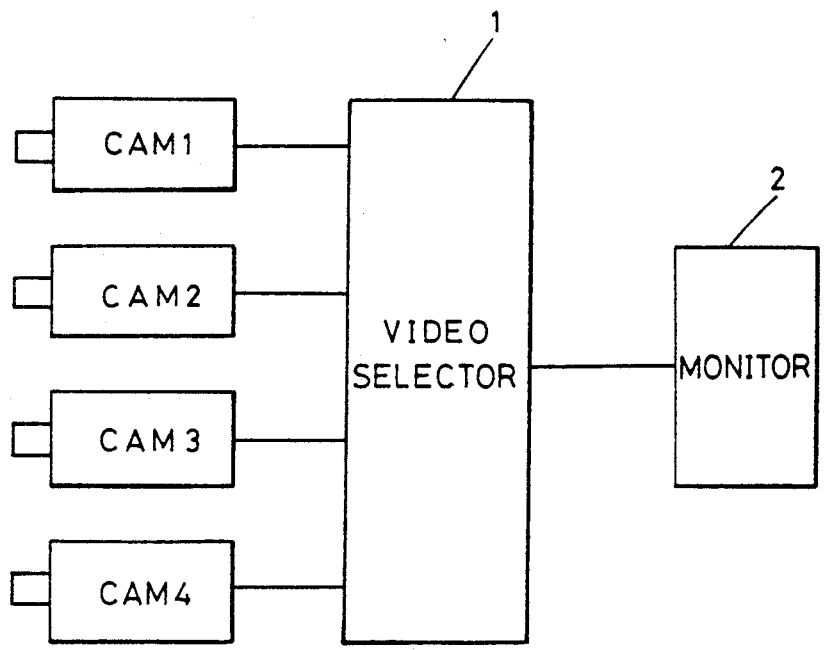
FIG. 1A is a block diagram of a conventional CCTV monitoring system.
Figure 1B:
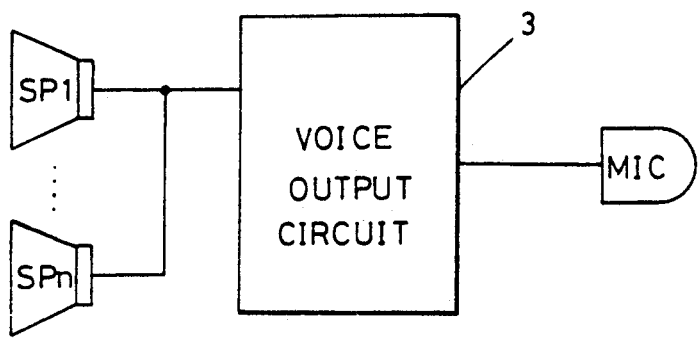
FIG. 1B is a block diagram of a voice output system which is applied to the conventional CCTV monitoring system.
Figure 2:
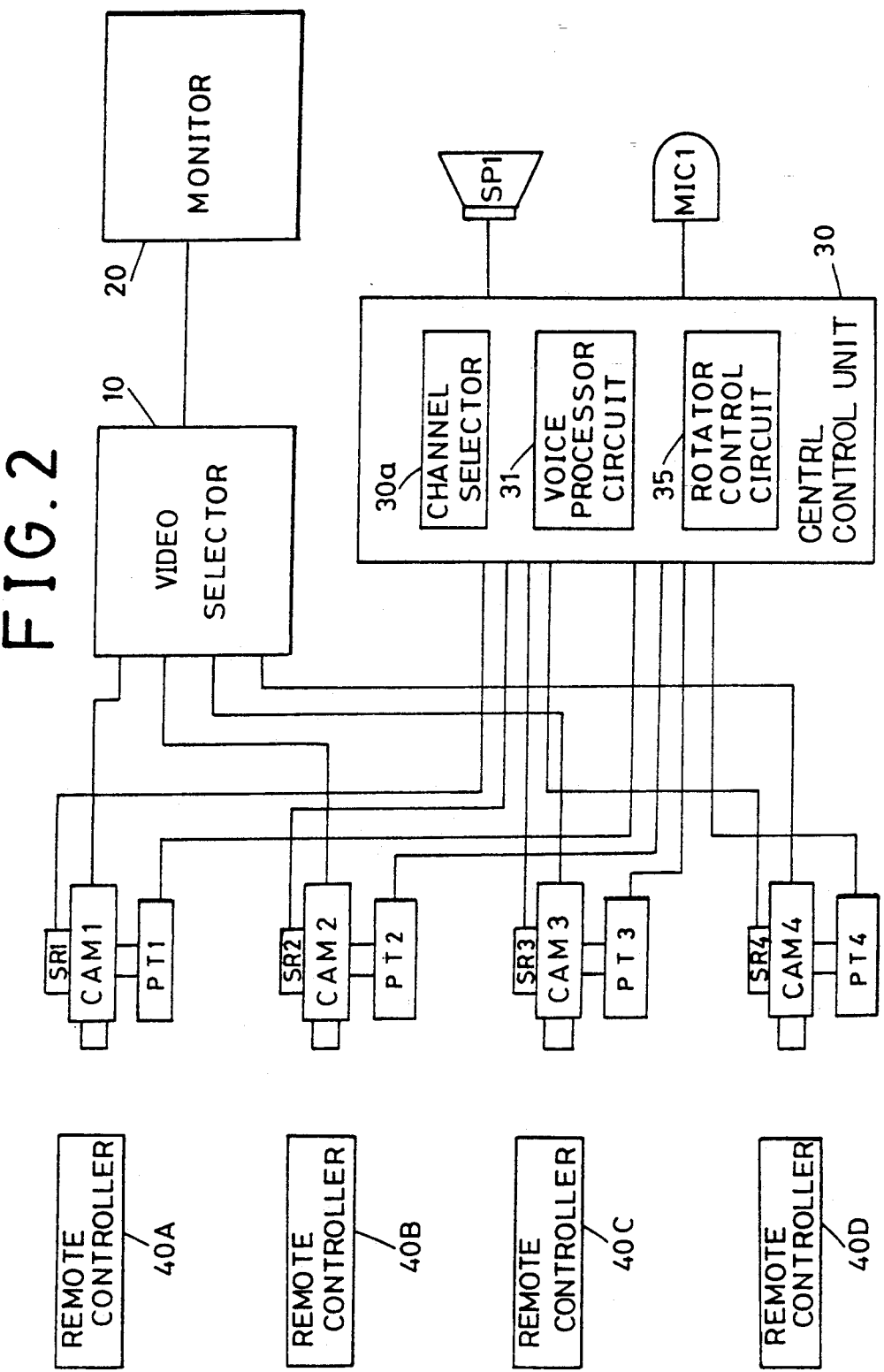
FIG. 2 is a block diagram of a bidirectional communication system for a CCTV in accordance with the present invention.

Referring to FIG. 2, there is shown a block diagram of a block diagram of a bidirectional communication system for a CCTV in accordance with the present invention. As shown in this drawing, the CCTV bidirectional communication system of the present invention comprises a plurality of voice transmission and reception adapters SR1-SR4, each mounted to a corresponding one of a plurality of cameras CAM1-CAM4, for transmitting and receiving a voice signal, a plurality of rotators PT1-PT4, each for rotating a corresponding one of the plurality of cameras CAM1-CAM4 in vertical and horizontal directions in response to upward, downward, left and right rotation control signals, a video selector 10 for selecting a desired one of video signals from the plurality of cameras CAM1-CAM4 and displaying the desired video signal through a monitor 20, a central control unit 30 for selecting a desired channel for voice communication and camera rotation control under a user's selection, performing transmission and reception of the voice signal through the plurality of voice transmission and reception adapters SR1-SR4 and generating the upward, downward, left and right rotation control signals for controlling actuation of the plurality of rotators PT1-PT4, thereby to control projection angles of the plurality of cameras PT1-PT4, and a plurality of remote controllers 40A-40D, each for transmitting and receiving the voice signal to/from the central control unit 30 through a corresponding one of the plurality of voice transmission and reception adapters SR1-SR4.

Figure 4:
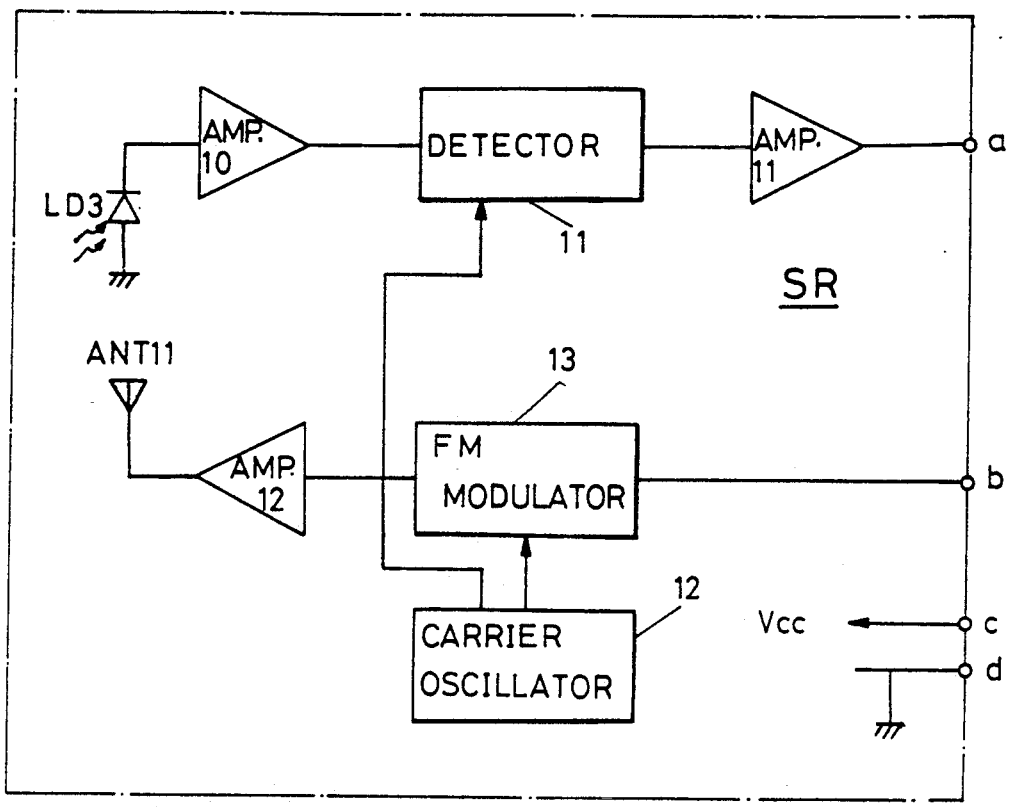
FIG. 4 is a detailed circuit diagram of voice transmission and reception adapters in the system in FIG. 2.

Referring to FIG. 4, there is a detailed circuit diagram of the voice transmission and reception adapters SR1-SR4 in the system in FIG. 2. As shown in this figure, the voice transmission and reception adapters SR1-SR4 each includes an input stage having an infrared receiver (a light receiving diode LD3 in the preferred embodiment of the present invention) for receiving an infrared signal transmitted from a corresponding one of the plurality of remote controllers 40A-40D and an amplifier AMP10 for amplifying the infrared signal received by the infrared diode LD3 by a predetermined level, a detector 11 for detecting the voice signal from an output signal from the amplifier AMP10 in the input stage, amplifying the detected voice signal through an amplifier AMP11 by a predetermined level and outputting the amplified voice signal to the central control unit 30, a FM modulator 13 for inputting the voice signal from the central control unit 30 and FM-modulating the inputted voice signal, a transmitter (an amplifier AMP12 in the preferred embodiment of the present invention) for amplifying an output signal from the FM modulator 13 by a predetermined level and transmitting the amplified signal to the corresponding one of the plurality of remote controllers 40A-40D through an antenna ANT11, and a carrier oscillator 12 for oscillating a carrier necessary to the detector 11 and the FM modulator 13.

Figure 3:
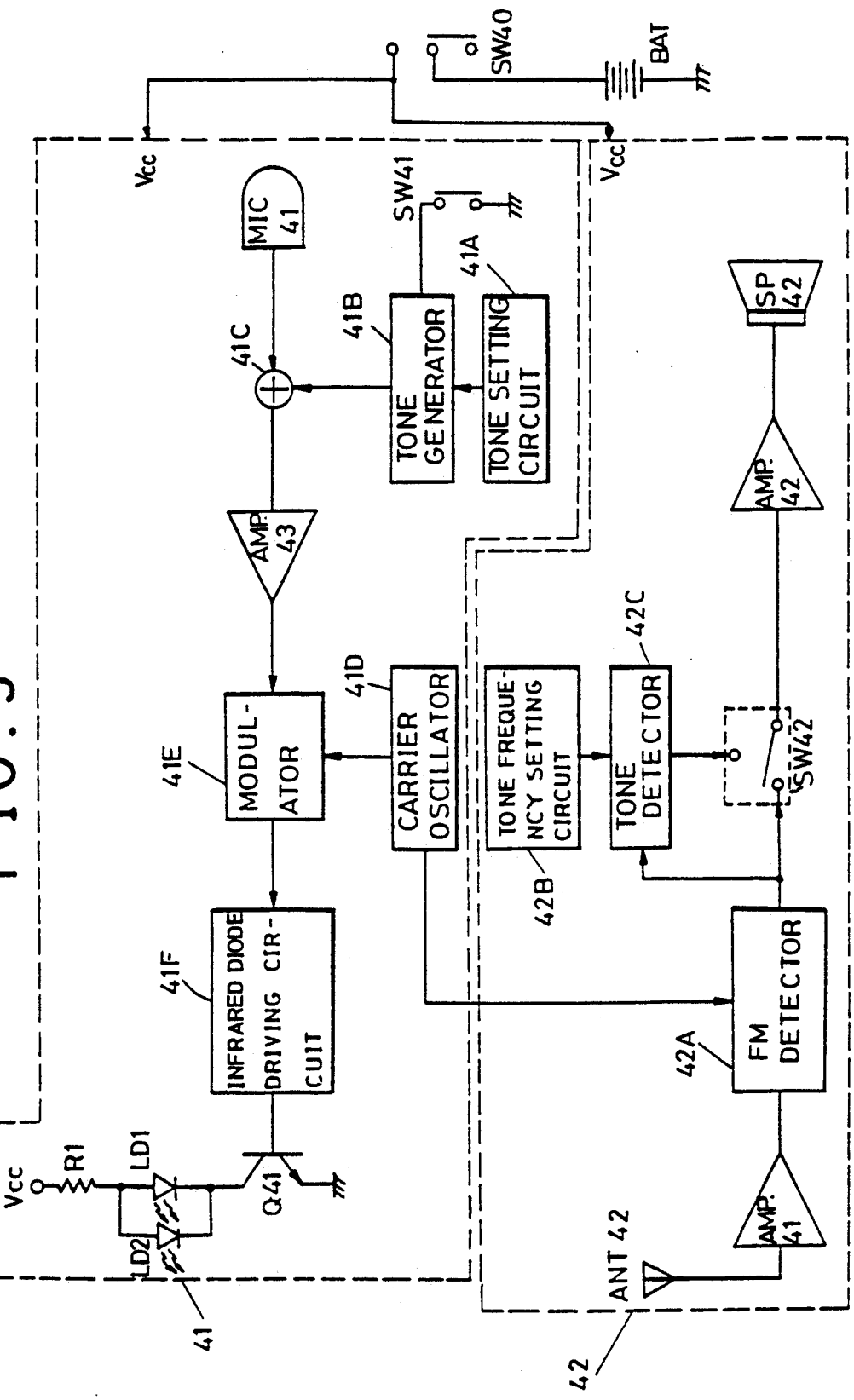
FIG. 3 is a detailed circuit diagram of remote controllers in the system in FIG. 2.

Referring to FIG. 3, there is shown a detailed circuit diagram of the remote controllers 40A-40D in the system in FIG. 2. As shown in this drawing, the remote controllers 40A-40D each includes a transmitter 41 and a receiver 42.

The transmitter 41 includes a tone generator 41B for generating a tone signal set by a tone setting circuit 41A under a control of a tone switch SW41, a mixer 41C for mixing an output signal from the tone generator 41B with an output signal from a microphone MIC41, an amplifier AMP43 for amplifying an output signal from the mixer 41C by a predetermined level, a modulator 41E for modulating an output signal from the amplifier AMP43, a carrier oscillator 41D for oscillating a carrier necessary to the modulator 41E and the receiver 42 of the remote controller, and an infrared diode driving circuit 41F for driving infrared generators (light emitting diodes LD1 and LD2 in the preferred embodiment of the present invention) in response to an output signal from the modulator 41E to output the infrared signal.

The receiver 42 includes an amplifier AMP41 for inputting the voice signal from a corresponding one of the plurality of voice transmission and reception adapters SR1-SR4 and amplifying the inputted voice signal by a predetermined level, a FM detector 42A for detecting a FM signal from an output signal from the amplifier AMP41, a tone detector 42C for comparing an output signal from the FM detector 42A with a tone frequency set by a tone frequency setting circuit 42B to detect a tone signal of the same frequency from the output signal from the FM detector 42A, and an amplifier AMP42 for inputting the output signal from the FM detector 42A in response to the tone detection of the tone detector 42C, amplifying the inputted signal by a predetermined level and outputting the amplified signal to a speaker SP42.

Referring again to FIG. 2, the central control unit 30 includes a channel selector 30a having a plurality of select switches SW5-SW8, each for selecting the desired channel for the voice communication and camera rotation control and a transmission and reception switch SW9, a voice processing circuit 31 for processing the voice signals from/to the voice transmission and reception adapters SR1-SR4, and a rotator control circuit 35 for generating the upward, downward, left and right rotation control signals to the rotators PT1-PT4 to rotate the cameras CAM1-CAM4 in the vertical and horizontal directions.

Figure 5A:
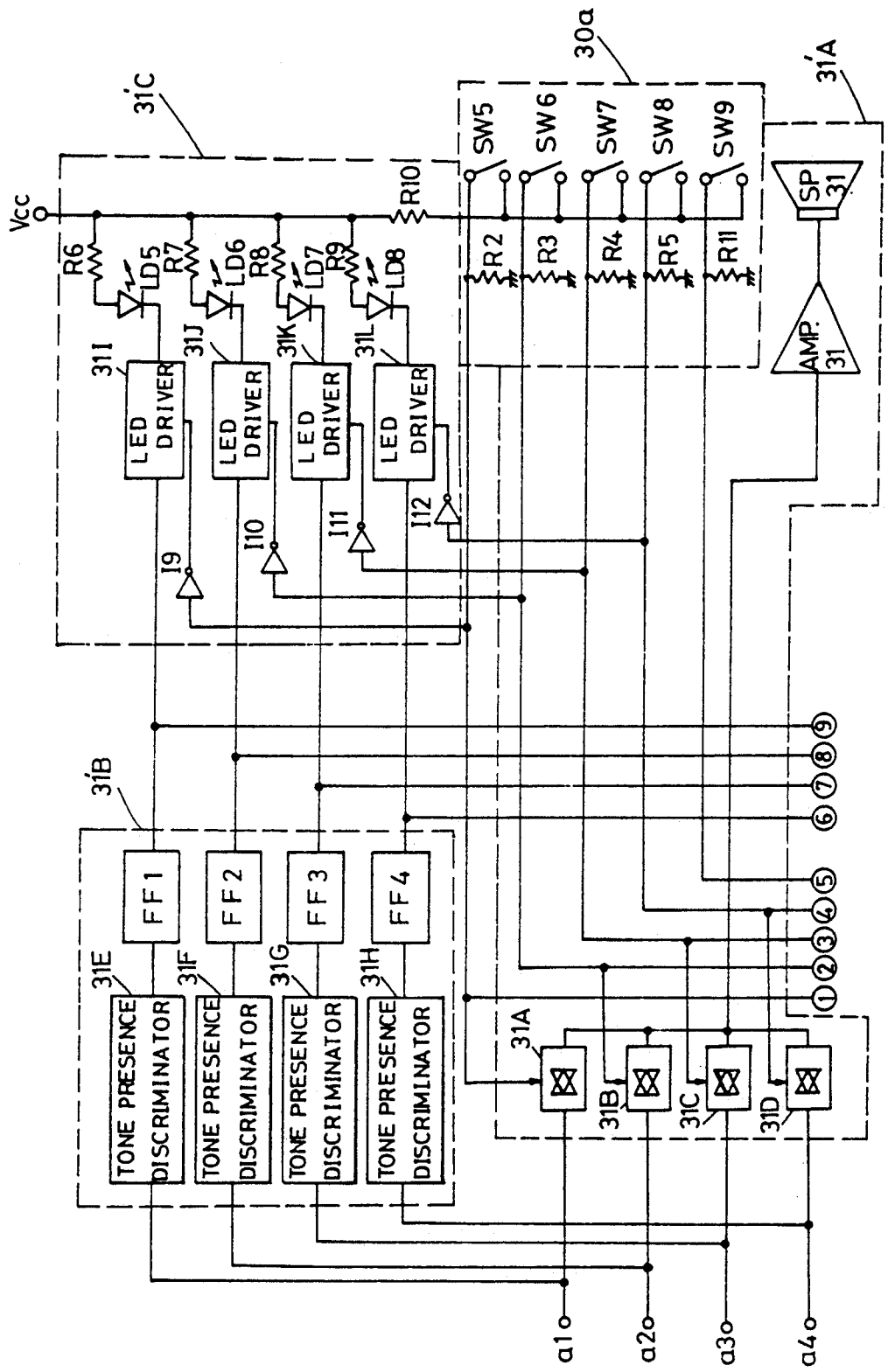
FIGS. 5A and 5B are detailed circuit diagrams of a voice processing circuit in a central control unit in the system in FIG. 2.
Figure 5B:
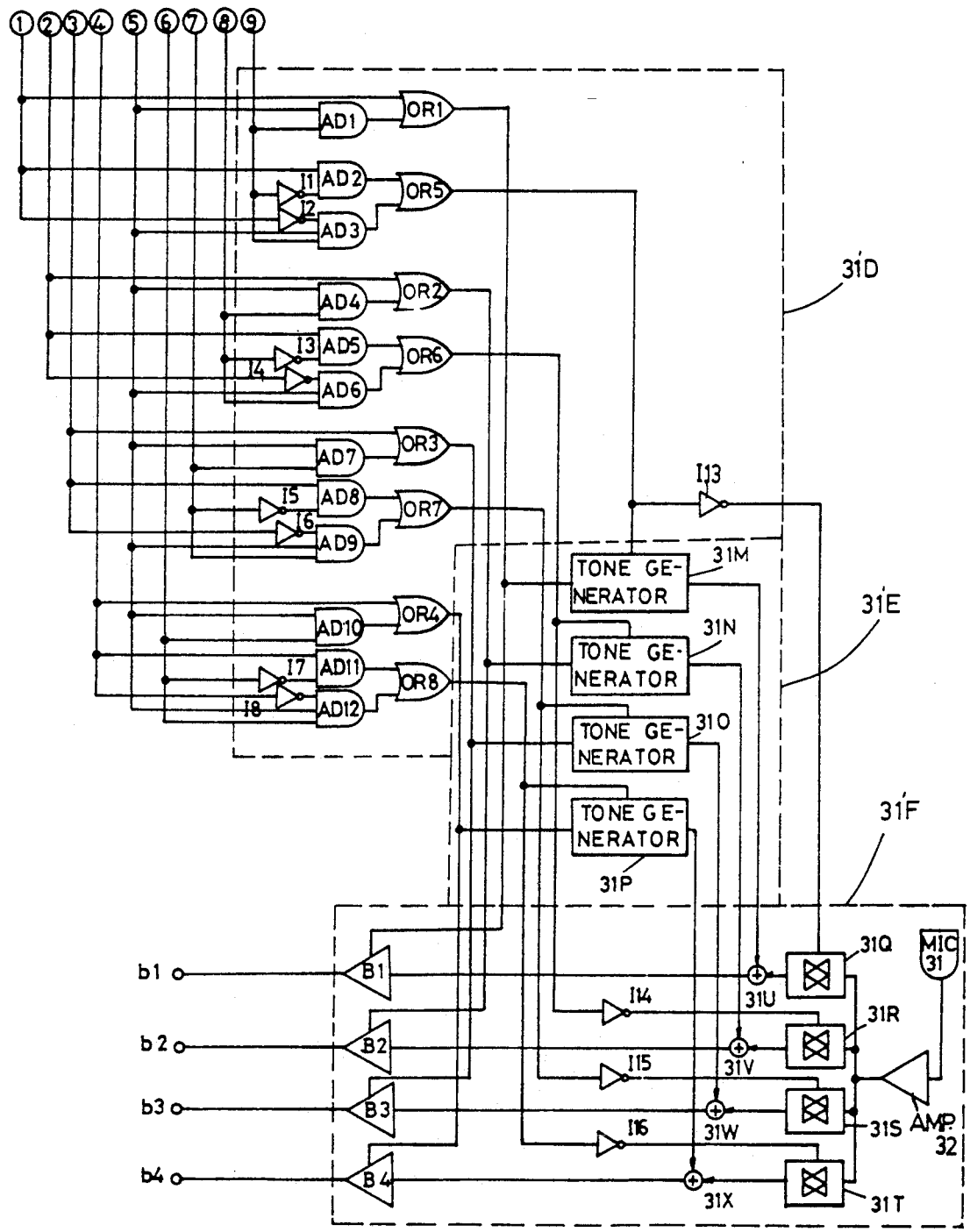

Referring to FIGS. 5A and 5B, there are shown detailed circuit diagrams of the voice processing circuit 31 in the central control unit 30 in the system in FIG. 2. As shown in this drawing, the voice processing circuit 31 includes a voice signal input circuit 31'A for selectively inputting the voice signals from the plurality of voice transmission and reception adapters SR1-SR4 in response to turning-on/off of the select switches SW5-SW8 in the channel selector 30a and outputting the inputted voice signals to a speaker SP31, a tone detecting circuit 31'B for detecting tones of the voice signals from the plurality of voice transmission and reception adapters SR1-SR4 and outputting a control signal according to the presence of the detected tone, a channel indicating circuit 31'C for indicating a selected channel in response to an output signal from the tone detecting circuit 31'B upon turning-on of a corresponding one of the select switches SW5-SW8, a transmission control circuit 31'D for combining the output signal from the tone detecting circuit 31'B with an output signal from the corresponding one of the select switches SW5-SW8 in the channel selector 30a to output a tone generation control signal and a voice signal transmission control signal, a tone generating circuit 31'E for generating a tone of a corresponding channel in response to the tone generation control signal from the transmission control circuit 31'D, and a voice signal output circuit 31'F for combining an output signal from the tone generating circuit 31'E with an output signal from a microphone MIC31 in response to the voice signal transmission control signal from the transmission control circuit 31'D and outputting the combined signal as the voice signal.

Figure 7:
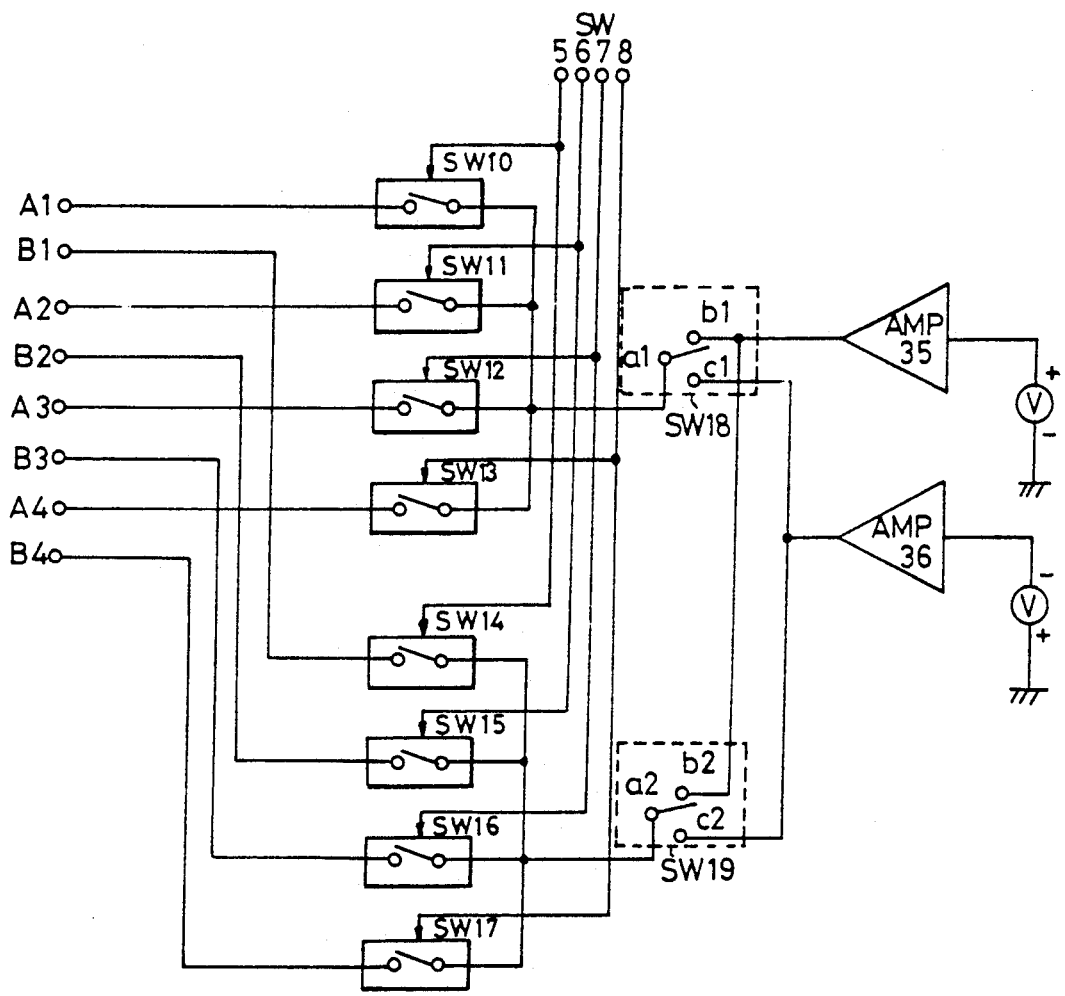
FIG. 7 is a detailed circuit diagram of a rotator control circuit in the central control unit in the system in FIG. 2.

Referring to FIG. 7, there is shown a detailed circuit diagram of the rotator control circuit 35 in the central control unit 30 in the system in FIG. 2. As shown in this drawing, the rotator control circuit 35 includes control voltage generators AMP35 and AMP36 for generating positive and negative voltages for camera rotation control, respectively, an upward/downward rotation control switch SW18 for selecting the positive voltage from the control voltage generator AMP35 or the negative voltage from the control voltage generator AMP36 to output the upward/downward rotation control signal, a left/right rotation control switch SW19 for selecting the positive voltage from the control voltage generator AMP35 or the negative voltage from the control voltage generator AMP36 to output the left/right rotation control signal, and a plurality of output select switches SW10-SW13 and SW14-SW17 for turning on/off control lines of corresponding channels in response to turning-on/off of the select switches SW5-SW8 to control the output of the upward, downward, left and right rotation control signals from the upward/downward rotation control switch SW18 and the left/right rotation control switch SW19 to the rotators PT1-PT4 of the corresponding channels.

The operation of the CCTV bidirectional communication system with the above-mentioned construction in accordance with the present invention will hereinafter be described in detail with reference to FIGS. 3 to 9.

First briefly stated with reference to FIG. 2, the video signals obtained through the cameras CAM-1-CAM4 are applied to the video selector 10, which selects one of the applied video signals and displays the selected video signal through the monitor 20. The voice signals from the voice transmission and reception adapters SR1-SR4 mounted to the corresponding cameras CAM1-CAM4 are applied to the voice processing circuit 31 in the central control unit 30, which selects one of the received voice signals and outputs the selected voice signal to the speaker SP1. Also, the voice processing circuit 31 outputs the voice signal received through the microphone MIC1 to one of the voice transmission and reception adapters SR1-SR4 through a selected transmission channel.

It should be noted herein that the voice transmission and reception adapters SR1-SR4 each transmits a FM-modulated radio signal and receives an infrared signal.

The remote controllers 40A-40D each transmits an infrared signal of a select frequency and receives a FM-modulated radio signal, in the opposite manner to that of each the voice transmission and reception adapters SR1-SR4. As a result, the central control unit 30 can readily recognize certain persons calling with the remote controllers 40A-40D and transmit a message to the persons with the remote controllers 40A-40D.

The rotators PT1-PT4 are mounted to the corresponding cameras CAM1-CAM4 to control the projection angles thereof. The central control unit 30 controls the rotators PT1-PT4 such that the corresponding cameras CAM1-CAM4 can shot objects in the places being monitored, in desired shooting angles.

Then, the operations of the components in the system will be described in detail.

First, the operation of one of the remote controllers 40A-40D will hereinafter be described as an example with reference to FIG. 3. The remote controller 40A essentially includes the transmitter 41 and the receiver 42. Normal times, a power switch SW40 is turned off and only the reception operation of the remote controller is thus performed.

In the receiver 42, the amplifier AMP41 amplifies the signal from a corresponding one of the voice transmission and reception adapters SR1-SR4 received through an antenna ANT42 by a predetermined level and then applies the amplified signal to the FM detector 42A, which detects a FM signal from the received signal and then the detected FM signal to the tone detector 42C. Upon receiving the FM signal from the FM detector 42C, the tone detector 42C scans a tone frequency of the received FM signal. Upon detection of the frequency tone set by the tone frequency setting circuit 42B from the received FM signal as a result of the scanning, the tone detector 42C outputs a switching control signal of high level to a switch SW42 to turn on the switch SW42, thereby causing the output signal from the FM detector 42A to be fed through the speaker driving amplifier AMP42 to the speaker SP42. As a result, the voice is outputted through the speaker SP42.

In the transmitter 41, upon pushing a call button under the condition that a battery BAT power is fed to the transmitter 41 by turning-on of the power switch SW40, the tone generator 41B generates the tone signal set by the tone setting circuit 41A. The mixer 41C mixes the tone signal from the tone generator 41B with the output singal from the microphone MIC41 and applies the mixed signal to the amplifier AMP43, which amplifies the received signal by a predetermined level. The output signal from the amplifier AMP43 is applied to the modulator 41E, which modulates the received signal at the oscillating frequency from the carrier oscillator 41D.

The output signal from the modulator 41D is applied to the infrared diode driving circuit 41F, which drives a transistor Q41, thereby causing the infrared diodes LD1 and LD2 to be turned on. As a result, the infrared signals are transmitted from the infrared diodes LD1 and LD2.

Then, the operation of one of the voice transmission and reception adapters SR1-SR4 will hereinafter be described as an example with reference to FIG. 4. The infrared signal from the remote controller 40A is received by the infrared diode LD3 and then amplified by a predetermined level by the amplifier AMP10. The detector 11 detects the voice signal from the output signal from the amplifier AMP10 and outputs the detected voice signal to the amplifier AMP11, which amplifies the received voice signal by a predetermined level and outputs the amplified voice signal to voice input terminals a1-a4 of the voice processing circuit 31 in the central control unit 30.

Also, the voice signal from the voice processing circuit 31 in the central control unit 30 is applied to the FM modulator 13, which FM-modulates the received voice signal at the carrier outputted from the carrier oscillator 12. The FM-modulated signal from the FM modulator 13 is transmitted as a radio signal through the amplifier AMP12 and the antenna ANT11.

Referring to FIGS. 5A and 5B, the voice signals from the voice transmission and reception adapters SR1-SR4 mounted to the corresponding cameras CAM1-CAM4 are applied to the corresponding receiving terminals a1-a4 of the voice processing circuit 31 and then to corresponding tone presence discriminators 31E-31H in the tone detecting circuit 31'B. Upon presence of the tone in any one of the voice signals from the voice transmission and reception adapters SR1-SR4, a corresponding one of flip-flops FF1-FF4 is set.

The output signal from the set flip-flop drives a corresponding one of the LED drivers 31I-31L, thereby causing a corresponding one of LEDs LD5-LD8 to emit light therefrom. This enables the user to recognize a channel in which a call is generated.

Provided that a call is generated from the voice transmission and reception adapter SR1 mounted to the camera CAM1, the tone presence discriminator 31E discriminates presence of the tone in the voice signal from the voice transmission and reception adapter SR1 and outputs a high signal according to the presence of the tone. The high signal from the tone presence discriminator 31E sets the flip-flop FF1. As a result, the set flip-flop FF1 outputs a high signal enabling the LED driver 31I to drive the LED LD5. Seeing the LED LD5 being driven, the user recognizes the call has been generated in the channel 1 and then pushes the channel 1 select switch SW5. Then, a power source voltage Vcc is applied to a clear terminal CL1 of the LED driver 31I through an inverter I9. In result, the LED driver 31I is cleared and the LED LD5 is turned off.

The power source voltage Vcc applied through the switch SW5 also turns on a transfer gate 31A which is used as a select analog switch. As a result, the voice signal received through the receiving terminal a1 is also applied through the turned-on transfer gate 31A to an amplifier AMP31, which amplifies the received voice signal by a predetermined level and then outputs the amplified signal to the speaker SP31.

Under the condition that the holding switch SW9 is turned off, a low signal is outputted from an AND gate AD1 and a high signal through the select switch SW5 is applied to an input terminal of an OR gate OR1. As a result, the OR gate OR1 outputs a high signal enabling a buffer B1 to be turned on, thereby causing the output signal from the microphone MIC31 to be outputted to a transmission terminal b1 through an amplifier AMP32, a transfer gate 31Q and the buffer B1.

The voice signal from the transmission terminal b1 of the voice processing circuit 31 is transmitted via the voice transmission and reception adapter SR1 to the receiving amplifier AMP41 in the remote controller 40A and, thus, to the person with the remote controller 40A. At this time, low signals are outputted from AND gates AD2 and AD3, thereby causing a low signal to be applied to an OR gate OR5. As a result, a tone generator 31M is not actuated and only the output signal from the microphone MIC31 is thus applied to a mixer 31U.

When the user pushes the select switch SW5 to call the person with the remote controller 40A, the flip-flop FF1 outputs a low signal since the holding switch SW9 is turned off and no received signal is present. The turning-on of the select switch SW5 causes low signals to be outputted from the AND gates AD1 and AD3 and a high signal to be outputted from the AND gate AD2. As a result, high signals are outputted from the OR gates OR1 and OR5, resulting in turning-on of the tone generator 31M. The turning-on of the tone generator 31M enables the signal therefrom to be transmitted to the receiver of the remote controller 40A through the mixer 31U and the buffer B1. In result, the person with the remote controller 40A is called by the user.

It should be noted herein that the generation of the tones of different tone frequencies from the tone generators 31M-31P corresponding to the different channels allows the central control unit 30 to call the persons with the remote controllers 40A-40D individually. Namely, the central control unit 30 can readily call even the person with the remote controller apart from the camera utilizing the radio FM.

On the other hand, when the calls are simultaneously generated from the plurality of remote controllers, for example, from the channels 1, 2 and 3, the LEDs LD5, LD6 and LD7 are turned on by the above process. At this time, if the user selects a desired channel (for example, channel 1) and then turns on the holding switch SW9, a high signal is outputted from the AND gate AD1, thereby causing the output signal from the microphone MIC31 to be transmitted to the receiver of the remote controller 40 through the amplifier AMP32, the transfer gate 31Q, the mixer 31U and the buffer B1. As a result, the user can communicate with the person with the remote controller 40.

At this time, since the outputs of the AND gates AD2 and AD3 are low and the output of the OR gate OR5 is also low, no output is generated from the tone generator 31M, but a high signal is applied to a control terminal of the transfer gate 31Q through an inverter I13. Therefore, the transfer gate 31Q is turned on.

On the other hand, high signals are outputted from flip-flops FF2 and FF3 because of generation of the calls in the channels 2 and 3. At this time, a high signal is applied through the holding switch SW9 to one terminals of AND gates AD4, AD6, AD7 and AD9, thereby causing high signals to be outputted from the AND gates AD4, AD6, AD7 and AD9 and, thus, from OR gates OR2, OR6, OR3 and OR7. As a result, tone generators 31N and 31O are turned on, thereby to output tones. The tones from the tone generators 31N and 31O are transmitted to the receivers of the corresponding remote controllers 40 through corresponding mixers 31V and 31W and corresponding buffers B2 and B3. The transmitted tones results in generation of wait signals in the corresponding remote controllers. In result, the persons with the corresponding remote controllers 40 can recognize the wait signals.

Also, low signals are outputted from all AND gates AD10, AD11 and AD12 because of the presence of no call in the channel 4, thereby causing corresponding tone generator 31P to be not actuated. At this time, a flip-flop FF4 and a buffer B4 are maintained at their OFF states.

Figure 6:
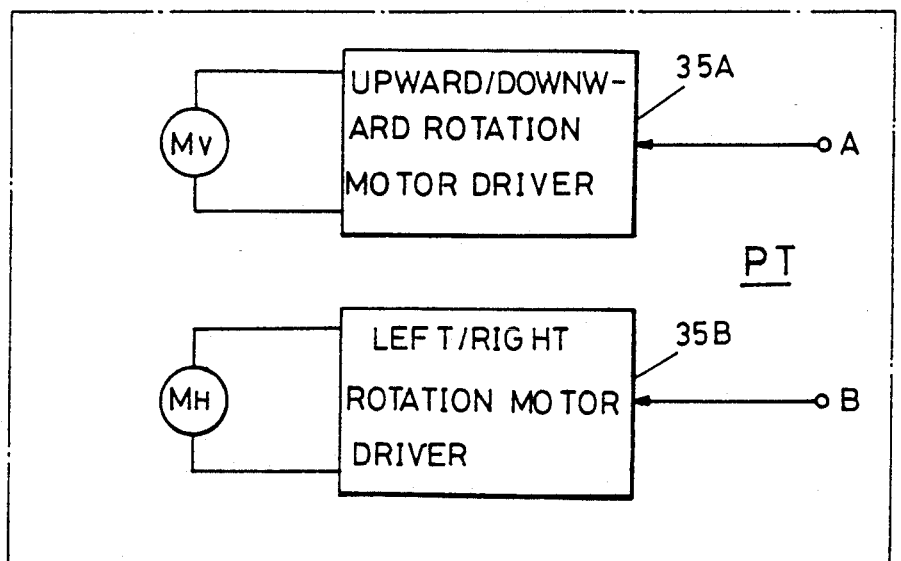
FIG. 6 is a detailed block diagram of rotators in the system in FIG. 2.

The operations of the rotators PT1-PT4 and the rotator control circuit 35 will hereinafter be described with reference to FIGS. 6 and 7. The power source voltage is applied to fixed terminal b1 and b2 of the switches SW18 and SW19, respectively, through the current amplifiers AMP35 and AMP36. When the user pushes the switches SW5, a high signal is applied through the switch SW5 to the rotator switches SW10 and SW14, thereby causing the rotator switches SW10 and SW14 to be turned on. At this time, if a movable terminal a1 of the switch SW18 is connected to the fixed terminal b1 thereof, a positive (+) voltage is applied to an upward/downward rotation motor driver 35A through the current amplifier AMP35 and the switches SW18 and SW12, thereby causing an upward/downward rotation motor Mv to rotate upward. The upward rotation of the upward/downward rotation motor Mv moves the camera CAM3 upward. When the movable terminal a1 of the switch SW18 is connected to a fixed terminal c1 thereof, a negative (−) voltage is applied to the upward/downward rotation motor driver 35A through the current amplifier AMP36 and the switches SW18 and SW12, thereby causing the upward/downward rotation motor Mv to rotate downward. The downward rotation of the upward/downward rotation motor Mv moves the camera CAM3 downward.

Similarly, a movable terminal a2 of the switch SW19 is connected to the fixed terminal b1 thereof, the positive (+) voltage is applied to a left/right rotation motor driver 35B through the current amplifier AMP35 and the switches SW19 and SW16, thereby causing the rotator PT3 to rotate left. The left rotation of the rotator PT3 moves the camera CAM3 left. When the movable terminal a2 of the switch SW19 is connected to a fixed terminal c2 thereof, the negative (−) voltage is applied to the left/right rotation motor driver 35B through the current amplifier AMP36 and the switches SW19 and SW16, thereby causing the rotator PT3 to rotate right. The right rotation of the rotator PT3 moves the camera CAM3 right.

In this manner, the user can change the projection angle of the camera of the desired channel by pushing the select switch of the desired channel and operating the rotator control switch.

Figure 8:
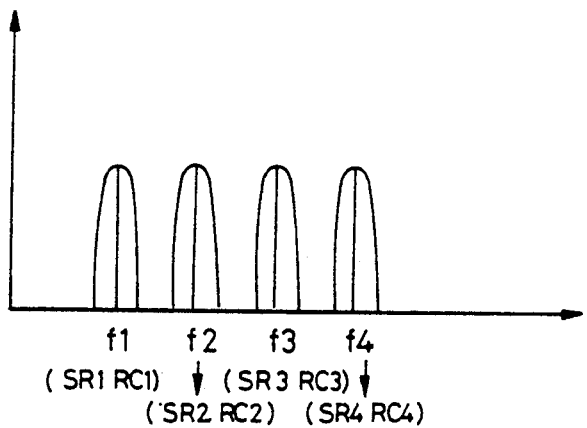
FIG. 8 is a block diagram of an embodiment of the bidirectional communication system for the CCTV in accordance with the present invention.

Referring to FIG. 8, there is shown a block diagram of an embodiment of the bidirectional communication system for the CCTV in accordance with the present invention. The operation of the CCTV bidirectional communication system of the present invention will hereinafter be described briefly with reference to FIG. 8. In operation, the video signals obtained through the cameras CAM1-CAM4 are applied to the video selector 10, which selects one of the applied video signals and displays the selected video signal through the monitor 20. The observer on the central control unit 30 upon transmission of the voice signal to the objects through the remote controllers 40 can issue voice orders to the objects, individually, at the different using tone frequencies of the remote controllers 40.

Figure 9:
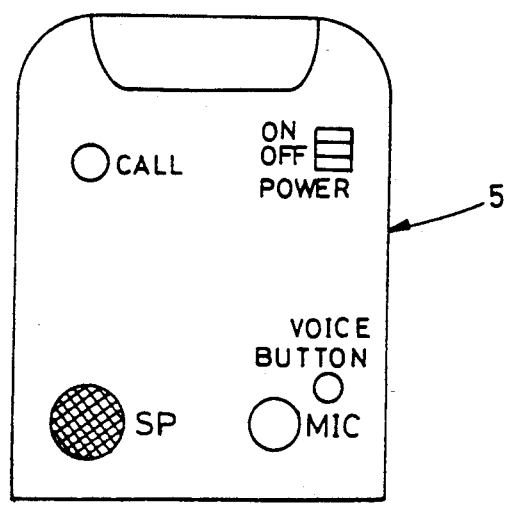
FIG. 9 is a waveform diagram illustrating a frequency characteristic of remote controllers in the system in FIG. 8 in accordance with the present invention.

Namely, in FIG. 9, a frequency f1 is used as the tone frequencies of the remote controller 40A and the voice transmission and reception adapter SR1. Also, frequencies f2, f3 and f4 are used as the tone frequencies of the remote controllers 40B-40D and the voice transmission and reception adapters SR2-SR4, respectively. Therefore, the individual voice orders can be issued.

Also, since the remote controllers 40A-40D call the central control unit 30 using the infrared signals, the central control unit can recognize the calling channel although the remote controllers 40A-40D use the same tone frequency. In other words, the remote controllers 40A-40D call the central control unit 30 using the infrared signals of the same using tone frequency and the central control unit 30 calls the remote controllers 40A-40D using the FM radio signals of the different using tone frequencies. Therefore, the individual calls are enabled.

As hereinbefore described, according to the present invention, there is provided the bidirectional communication system for the CCTV which is capable of building up the smooth and accurate bidirectional communication network between the observer and the object to be monitored. The observer can issue the individual voice orders to the places in which the cameras are disposed and the persons in the places can send their messages to the observer using their voices. Therefore, the smooth and accurate bidirectional communication network between the observer and the objects can be built up. Also, the central control unit transmits the message to the persons in the places using the FM radio signals of the different using tone frequencies and the remote controllers call the central control unit using the infrared signals of the same using tone frequency. Therefore, an interference between the cameras can be prevented and the individual calls are enabled. Furthermore, the central control unit is connected via the voice transmission and reception adapters to the cameras by wire and via the remote controllers to the persons in the places in which the cameras are disposed. Hence, a convenience and a movability of the communication can be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bidirectional communication system for a CCTV in a monitoring system having a plurality of monitoring cameras, comprising:
    a plurality of rotators, each for rotating a corresponding one of said plurality of cameras in vertical and horizontal directions in response to upward, downward, left and right rotation control signals;
    a plurality of voice transmission and reception means, each mounted to a corresponding one of said plurality of cameras, for transmitting and receiving a voice signal;
    a plurality of remote control means, each having a transmitter and a receiver for transmitting and receiving the voice signal remotely through a corresponding one of said plurality of voice transmission and reception means;
    video selecting means for selecting a desired one of video signals from said plurality of cameras;
    channel selecting means for selecting a desired channel for voice communication and camera rotation control;
    voice processing means for performing transmission and reception of the voice signal through said plurality of voice transmission and reception means; and
    rotator control means for generating the upward, downward, left and right rotation control signals for controlling actuation of said plurality of rotators, thereby to control projection angles of said plurality of cameras.

2. A bidirectional communication system for a CCTV as set forth in claim 1, wherein said voice transmission and reception means each includes:
    input means for receiving an infrared signal transmitted from a corresponding one of said plurality of remote control means and amplifying the received infrared signal by a predetermined level;
    a detector for detecting the voice signal from an output signal from said input means;
    a FM modulator for inputting the voice signal from said voice processing means and FM-modulating the inputted voice signal;
    a transmitter for amplifying an output signal from said FM modulator by a predetermined level and transmitting the amplified signal to the corresponding one of said plurality of remote control means; and a carrier oscillator for oscillating a carrier necessary to said detector and said FM modulator.

3. A bidirectional communication system for a CCTV as set forth in claim 1, wherein said voice processing means includes:

voice signal input means for selectively inputting the voice signals from said plurality of voice transmission and reception means in response to a channel select signal from said the channel selecting means and outputting the inputted voice signals to a speaker;

tone detecting means for detecting tones of the voice signals from said plurality of voice transmission and reception means and outputting a control signal according to the presence of the detected tone;

channel indicating means for indicating a selected channel in response to an output signal from said tone detecting means and in response to the channel select signal from said channel selecting means;

transmission control means for combining the output signal from said tone detecting means with the channel select signal from said channel selecting means to output a tone generation control signal and a voice signal transmission control signal;

tone generating means for generating a tone of a corresponding channel in response to the tone generation control signal from said transmission control means; and voice signal output means for combining an output signal from said tone generating means with an output signal from a microphone in response to the voice signal transmission control signal from said transmission control means and outputting the combined signal as the voice signal.

4. A bidirectional communication system for a CCTV as set forth in claim 1, wherein said rotator control means includes:

first and second control voltage generators for generating positive and negative voltages for camera rotation control, respectively;

an upward/downward rotation control switch for selecting the positive voltage from said first control voltage generator or the negative voltage from said second control voltage generator to output the upward/downward rotation control signal;

a left/right rotation control switch for selecting the positive voltage from said first control voltage generator or the negative voltage from said second control voltage generator to output the left/right rotation control signal; and a plurality of output select switches for turning on/off control lines of corresponding channels in response to a channel select signal from said channel selecting means to control the output of the left, right, upward and downward rotation control signals from said upward/downward rotation control switch and said left/right rotation control switch to said rotators of the corresponding channels.

5. A bidirectional communication system for a CCTV as set forth in claim 1, wherein said transmitters of said remote control means each includes:

a tone generator for generating a tone signal set by a tone setting circuit under a control of a tone switch;

a mixer for mixing an output signal from said tone generator with an output signal from a microphone;

an amplifier for amplifying an output signal from said mixer by a predetermined level;

a modulator for modulating an output signal from said amplifier; and an infrared diode driving circuit for driving infrared generators in response to an output signal from said modulator to output an infrared signal.

6. A bidirectional communication system for a CCTV as set forth in claim 1, wherein said receivers of said remote control means each includes:

a first amplifier for inputting the voice signal from the corresponding one of said plurality of voice transmission and reception means through an antenna and amplifying the inputted voice signal by a predetermined level;

a FM detector for detecting a FM signal from an output signal from said first amplifier;

a tone detector for comparing an output signal from said FM detector with a tone frequency set by a tone frequency setting circuit to detect a tone signal of the same frequency from the output signal from said FM detector; and a second amplifier for inputting the output signal from said FM detector in response to the tone detection of said tone detector, amplifying the inputted signal by a predetermined level and outputting the amplified signal to a speaker.

* * * * *